Sept. 7, 1965   K. V. KIRKPATRICK   3,204,565

POWER TRANSMISSION

Filed May 9, 1962

INVENTOR.
KINGSTON V. KIRKPATRICK
BY
ATTORNEYS

United States Patent Office 3,204,565
Patented Sept. 7, 1965

1

3,204,565
POWER TRANSMISSION
Kingston V. Kirkpatrick, Birmingham, Mich., assignor, by mesne assignments, to Sperry Rand Corporation, a corporation of Delaware
Filed May 9, 1962, Ser. No. 193,478
17 Claims. (Cl. 103—136)

This invention relates to power transmissions and is particularly applicable to those of the type comprising two or more fluid pressure energy translating devices, one of which may function as a pump and another as a fluid motor.

The invention relates generally to rotary fluid pumps or motors of the pressure-loaded cheek plate type and in particular to those of the reversible, sliding vane type.

One major problem encountered in designing rotary pumps and motors is that of providing proper clearance between the opposing faces of the rotor and the surfaces against which they rotate. A slight clearance should be provided in order for the rotor to run freely. In devices of the rigidly clamped, fixed side or cheek plate type, leakage will increase as the operating pressure increases, even though the running clearance be small and even where it is possible to maintain the small running clearance fixed under high pressure operating conditions. Actually, under extremely high pressure operating conditions, the high pressures existing along the outer faces of the rotor tend to deflect the inner faces of the cheek plates outwardly away from the rotor which tends to increase the running clearance between the rotor and cheeck plates and further increase leakage.

In rotary pumps or motors utilizing a single cheek plate of the pressure-loaded type, leakage between the rotor face on one side may be maintained substantially constant or even reduced with increases of pressure by utilizing a deflectable type of cheek plate as disclosed in the patent to Duncan B. Gardiner et al., No. 2,544,988. This does not, however, reduce the leakage factor on the opposite side of the rotor face. In some single pressure-loaded cheek plate devices under extremely high pressure conditions demanded in many present day hydraulic transmissions, there is a tendency for the inner surface of the fixed cheek plate on the opposite side of the rotor or the plane surface of the housing cavity wall to deflect outwardly to increase the leakage path. Also, in the single pressure-loaded cheek plate type of device, reversibility must be accomplished by the use of special valving, such as shuttle valves, in order to connect whichever is the high pressure side of the device to the outer pressure motive surface of the single cheek plate.

It has been proposed to utilize two pressure-loaded cheek plates to simultaneously control the running clearances on opposite sides of the rotor. In a fluid pump of this design, it is only necessary to connect the outlet or high pressure side of the pump to the outer pressure motive surfaces of the two cheek plates. If the same device is to be utilized as a fluid motor, the inlet of the motor, which is the high pressure side of the device, would be connected to the pressure motive surfaces of the two cheek plates. However, if the device is to be reversible, special valving, such as shuttle valves, must be provided to place whichever side of the device is the high pressure side in communication with the two pressure motive surfaces of the two cheek plates.

The present invention retains all of the advantages of the two pressure-loaded cheek plate type of device in maintaining proper rotor running clearance on both sides of the rotor but is inherently reversible without the use of special valving such as shuttle valves. The present invention utilizes two cheek plates on opposite sides of the rotor, either of which may be pressure-loaded, dependent on the direction of operation of the device, while the other cheek plate, although not being pressure-loaded, is urged by a reaction force toward the rotor.

The present invention device utilizes a cartridge assembly comprising a rotor rotatably mounted within a spacer member, such as a vane track cam ring member of greater width than the rotor, and two cheek plates on opposite sides of the rotor. The cartridge assembly is floatably mounted within a cavity of the housing between two coaxially arranged abutments, the cartridge assembly being supported peripherally within the cavity and with flanged pressure motive portions on the outer faces of the cheek plates confronting chambers at opposite ends of the cavity and the abutments. The flanged portion of either cheek plate extends from the outer periphery inwardly beyond the spacer or cam ring member and is axially unrestrained when urged toward said chamber. Axial restraint is imposed upon another portion of the outer face of the non-pressure-loaded cheek plate by contact with the abutment on an annulus close to the axis of rotation. Thus, when pressure is imposed on the pressure motive portion of one of said cheek plates, the pressure-loaded plate is urged against the spacer member, the spacer member against the other cheek plate, and the other cheek plate against the abutment to impose a reaction force on the non-pressure-loaded plate for urging the inner face thereof toward the rotor.

Another important feature of the present invention is the utilization of two cheek plates of the elastic deflectable type. The cheek plates are constructed of a material such as cast iron and so designed as to permit a slight deflection toward the rotor. The line of deflection and amount thereof may be controlled from the modulus of elasticity of the material selected by providing a thickness and shape of the plate to give the result desired. The two plates may be basically identical, and increases of pressure imposed upon one of these plates tends to deflect the axially unsupported inner surface toward the rotor for reducing the running clearance and thus the size of the leakage path on that side of the rotor. Normally, high pressure acting on the inner face of the other cheek plate would tend to deflect the same outwardly to increase the running clearance on that side of the rotor. However, as the cartridge is floatably mounted within the cavity and as the flanged pressure motive portion of the non-pressure-loaded cheek plate is axially unrestrained, the complete cartridge is urged toward the abutment, and contact of the abutment correlated with pressure actuation from the opposite direction imposes a reaction force on the axially unsupported portion of the non-pressure-loaded plate tending also to deflect it inwardly toward the rotor so as also to reduce running clearance on that side of the rotor. Thus, one cheek plate is deflected inwardly toward the rotor by increases of system pressure and the other cheek plate is deflected inwardly toward the rotor due to the peripheral loading thereon and the restraining action radially inward of the flanged pressure motive portion of the plate near the axis of rotation of the rotor.

It is, therefore, an object of this invention to provide an improved dual cheek plate pump or motor.

It is another object of this invention to provide a dual cheek plate pump or motor, only one of which cheek plates is pressure-loaded, but which in effect performs as if both cheek plates were simultaneously pressure-loaded.

It is still another object of this invention to provide an improved dual check plate pump or motor which is reversible without the use of special valving.

It is a further object of this invention to provide an improved pump or motor utilizing two elastic deflectable cheek plates.

It is a further object of this invention to provide a reversible pump or motor having dual deflectable cheek plates, only one of which is pressure-loaded, dependent on the direction of operation of the device.

It is another object of this invention to provide a reversible pump or motor having features of reversibility and of maintaining proper running clearance on both sides of the rotor contributing to efficiency, reliability, and long life as well as ease of maintenance.

Further objects and advantages of the present invention will be apparent from the following description, reference being had to the accompanying drawing wherein a preferred form of the present invention is clearly shown.

Figure 1:
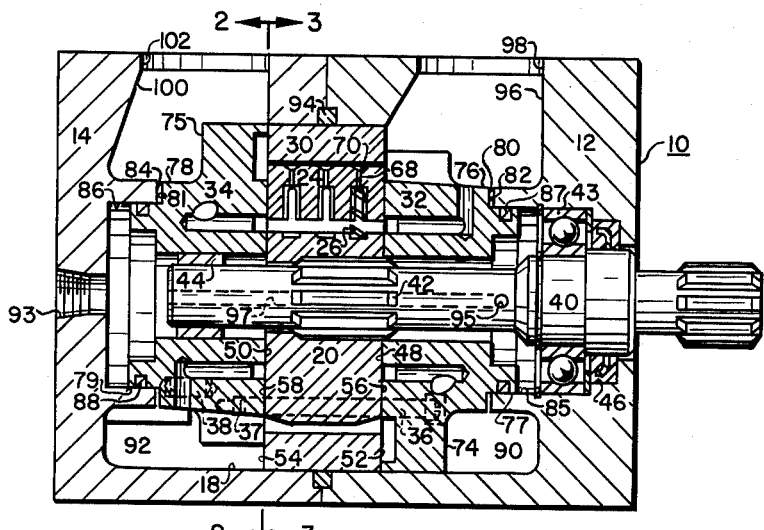
FIGURE 1 is a sectional view of a preferred form of the present invention taken on line 1—1 of either FIGURE 2 or 3.

Referring now to FIGURE 1, there is shown a fluid pump or motor, indicated generally by the numeral 10, comprising a two-section housing 12 and 14 suitably maintained together in fluid sealing relation by bolts 16 and having a cylindrical bore 18 in which is floatably mounted a fluid energy translating device, pump or motor, cartridge assembly. The assembly comprises a rotor 20 having a plurality of substantially radial slots 22 in each of which is slidable a vane 24, the outer tips of which are urged by springs 26 (only one of which is shown) against the inner periphery 28 of a spacer or vane track cam ring member 30, and two cheek plates 32 and 34 on opposite sides of the cam ring member 30 and rotor 20.

Figure 2:
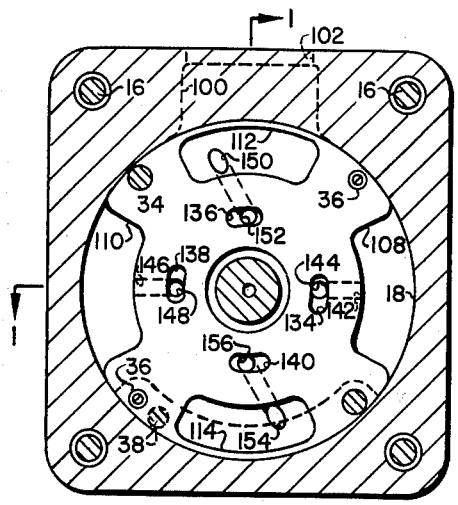
FIGURE 2 is a section taken on line 2—2 of FIGURE 1.

A plurality of bolts 36 extend through the cheek plate 32, ring member 30 and cheek plate 34, the bolts being threaded into tapped holes 37 of the cheek plate 34 for the purpose of holding the ring 30, rotor 20, and cheek plates 32 and 34 together as a cartridge unit assembly, although loosely so as to permit slight axial movement. The assembly is prevented from rotating in the cavity 18 by means of a dowel pin 38 loosely fitted in the housing section 14 and the cheek plate 34, as shown in FIGURES 1 and 2.

The rotor 20 is drivingly engaged with a shaft 40 by means of a spline connection indicated by the numeral 42, the shaft being supported within the housing 12 by means of a bearing 43 and also being supported by a bearing 44 located in the cheek plate 34. The spline on the shaft 40 fits the spline in the rotor with a small clearance so that a slight amount of play is provided radially and longitudinally for the rotor to take up a position in proper relationship with other elements of the cartridge assembly. A shaft seal 46 is provided preventing leakage of the shaft from the housing 12.

Figure 4:
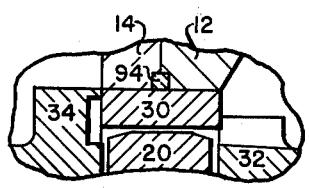
FIGURE 4 is a fragmentary view of FIGURE 1 showing rotor clearance in exaggerated form.

The cheek plates 32 and 34 are provided respectively with plane inner surfaces 48 and 50 which are adapted to be urged into proper sealing engagement and relation with opposite plane sides 52 and 54 of the ring member 30 and with opposite plane sides 56 and 58 of the rotor 20. As shown in exaggerated form in FIGURE 4, the ring member 30 is of slightly greater width than the rotor 20 to provide proper running clearance between the inner faces of the cheek plates and opposite sides of the rotor. As the cheek plates are adapted to deflect slightly, as shown in exaggerated form in FIGURE 5, the amount of running clearance is dependent upon the design of the cheek plate and the material of which it is constructed, one suitable material being cast iron. In the device illustrated the clearance is on the order of .0015 inch.

Figure 3:
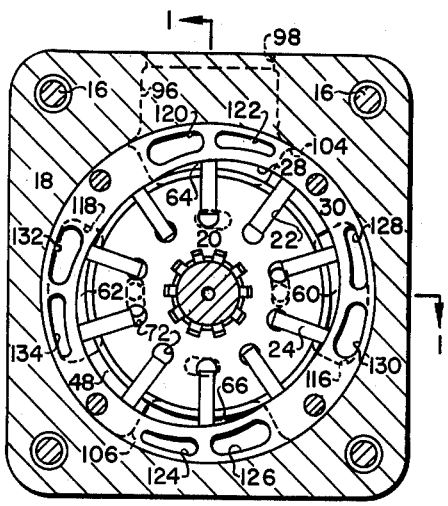
FIGURE 3 is a section taken on line 3—3 of FIGURE 1.

The inner periphery 28 of the ring member 30 is substantially elliptical in shape, and, with the circular rotor concentrically rotatably mounted therein, two pairs of diametrically opposed fluid zones are formed therein around the outer periphery of the rotor through which the outer ends of the vanes sweep with the outer tips thereof in engagement with the vane track. Either pair of fluid zones may be fluid inlet zones while the other pair of fluid zones are fluid outlet zones, depending upon the directional operation of the device. For the purposes of illustration one pair of fluid zones has been indicated by the numerals 60 and 62 while the other pair of fluid zones has been indicated by the numerals 64 and 66, as shown in FIGURE 3.

Each vane is provided with a plurality of stepped passages 68 having chamfered openings 70 at the tip of the vane, and within the enlarged portions of the passages are placed the springs 26. As the outer end of each vane sweeps through the fluid zones of the device, the pressure existing at the outer ends is transmitted to the inner chamber 72 of each vane slot by means of the vane passages 68 for the purpose of pressure balancing the vane. Outwardly urging force to maintain the tips of the vanes in contact with the vane track is provided by centrifugal force and the springs 26. As will hereinafter be explained, auxiliary in-phase porting is provided in the cheek plate for the inner chamber of each vane slot.

Each cheek plate is provided with a flanged outer surface (indicated by the numeral 74 for the cheek plate 32 and by the numeral 75 for the cheek plate 34) and with stepped hub portions (indicated by the numerals 76 and 77 for the cheek plate 32, and 78 and 79 for the cheek plate 34). The stepped hub portions form a shoulder 80 for the cheek plate 32 and a shoulder 81 for the cheek plate 34 which are adapted respectively to seat against and engage annular projections defining abutments 82 and 84 at each end of the bore 18. The hub portions 77 and 79 of the cheek plates 32 and 34 are respectively slidably supported in bores 85 and 86, with O-ring seals 87 and 88 being provided to prevent leakage, the bores 85 and 86 comprising stepped portions of the bore 18 and, because of connection to a bleed passage and port, hereinafter described, forming low pressure chambers for the hub portions 77 and 79.

Figure 5:
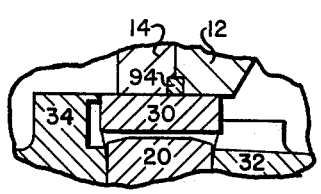
FIGURE 5 is a fragmentary view similar to FIGURE 4, but showing rotor clearance upon deflection of the cheek plates.

The cartridge assembly when mounted in the bore 18 between the axial abutments 82 and 84 forms and defines two chambers 90 and 92 within the bore at opposite sides of the cartridge assembly, either of which is adapted to be an inlet chamber while the other is an outlet chamber. The outer surface flanged portion of each cheek plate which extends from the outer periphery of the cheek plate radially inwardly beyond the cam ring member 30 is exposed to the chamber and axially unrestrained toward the chamber, being supported only peripherally. The flanged portion of each cheek plate together with the shoulder of each plate at the hub comprise a pressure motive portion which is adapted under increases of pressure to urge the said cheek plate against the cam ring, the cam ring against the other cheek plate, and the other cheek plate shoulder to engage the abutment at the opposite end of the cavity. As the flanged portion of the cheek plate facing whichever is the low pressure chamber of the device is axially unrestrained, the continued urging of the complete cartridge with the stepped shoulder portion engaging the abutment creates a reaction force on the shoulder which urges the cheek plate inwardly toward the cam ring and rotor. This reaction force is imposed on an annulus of the cheek plate fairly close to the axis of rotation of the device and, because the cheek plate is of the elastic deflectable type, the inner surface radially inward of the cam ring tends to deflect or dish inwardly, as shown in FIGURE 5, for reducing the running clearance on that side of the rotor. High pressure imposed on the pressure motive portion of the other cheek plate tends to deflect or dish the axially unsupported portion of the inner surface of that cheek plate inwardly toward the rotor and thus reduce the running clearance on that side of the cheek plate, is also shown in FIGURE 5. The shoulder of each cheek plate, formed at the stepped hub portion thereof, thus performs the dual function of being abutment engaging for imposing a reaction force axially on an annulus of the cheek plate close to the axis of rotation or being pressure motive together with the flanged portion, depending on the direction of operation of the device.

An O-ring seal 94 fitting in grooves of the housing members 12 and 14 engages the outer peripheral surface of the cam ring to prevent leakage from one end chamber to the other end chamber around the periphery of the cartridge assembly.

The extreme end faces of the cartridge assembly, comprising the outer surfaces of hub portions 77 and 79, are exposed to low pressure by reason of the hub bores or chambers 85 and 86 being connected through a shaft bleed passage to a bleed port 93 formed in housing section 14. The bleed passage comprises the stepped bore or chamber 85 in housing section 12, a transverse passage 95 in shaft 40 opening to chamber 85 and a longitudinal passage 97 intersecting passage 95 and extending through the shaft where it opens to chamber 86, the bleed port 93 being connected to the chamber 86.

For the purpose of making the device inherently reversible without the use of special valving, two flow passages opening to the exterior of the housing are independently connected to the chambers, and porting is provided in each cheek plate for independently connecting one of the chambers to one pair of fluid zones and the other chamber to the other pair of fluid zones. Thus, a flow passage 96 is provided in housing section 12, connected directly to chamber 90 and having an external opening connection 98. A flow passage 100 is also provided in housing section 14, connected directly to chamber 92 and having an external opening connection 102. Cheek plate 32 is provided with a pair of ports 104 and 106 (shown in dotted lines in FIGURE 3) formed by cutting away portions of the plate extending from the outer periphery of the plate, which ports are displaced 180° from each other and which extend completely through the plate. The ports 104 and 106 are adapted to connect chamber 90 to the pair of diametrically opposed fluid zones indicated by the numerals 64 and 66 shown in FIGURE 3. Cheek plate 34 is provided with a duplicate set of diametrically opposed cutaway ports 108 and 110, also displaced 180° from each other but displaced 90° apart from the duplicate ports in cheek plate 32, the ports 108 and 110 directly connecting the chamber 92 respectively to the other pair of diametrically opposed fluid zones indicated by the numerals 62 and 60 in FIGURE 3. Either of the flow passages 96 or 100 and either of the chambers 90 and 92 may be an inlet flow passage or an inlet flow chamber, respectively, while the other flow passage and chamber are respectively performing the function of an outlet passage and an outlet chamber.

The cheek plate 34 is provided with a pair of diametrically opposed, recessed ports 112 and 114, axially opposed to the diametrically opposed cutaway ports 104 and 106 in cheek plate 32, and the cheek plate 32 is provided with a pair of diametrically opposed, recessed ports 116 and 118, axially opposed to the cutaway ports 110 and 108 in cheek plate 34. In addition, the ring member 30 is provided with two pairs of diametrically opposed ports extending completely through the ring member, one pair of which (indicated by the numerals 120 and 122) connect the cutaway port 104 in cheek plate 32 with the recessed port 112 in cheek plate 34, and the other pair of which (indicated by the numerals 124 and 126) connect the cutaway port 106 in cheek plate 32 to the recessed port 114 in cheek plate 34.

The ring member 30 is also provided with two other pairs of diametrically opposed ports also extending completely through the ring, one pair of which (indicated by the numerals 128 and 130) connects cutaway port 110 in cheek plate 34 to the recessed port 116 in cheek plate 32 while the other pair of ports (indicated by the numerals 132 and 134) connects the cutaway port 108 in cheek plate 34 to the recessed port 118 in cheek plate 32.

In addition to the passage 68 in each vane 24, utilized for pressure balancing purposes, auxiliary porting is provided in each cheek plate for connecting whichever are the high pressure and low pressure sides of the device to the inner chambers of each vane in phase with the outer ends of the vanes passing through the high and low pressure fluid zones of the device. Referring to FIGURE 2, cheek plate 34 is provided with four recessed ports on its inner face which are spaced in 90° relationship and adapted to register with the inner chambers of the vane slots as the rotor turns, the ports being indicated by the numerals 134, 136, 138, and 140. Port 134 is connected to the cutaway port 108 by intersecting passages 142 and 144; port 136 is connected to recessed port 112 by intersecting passages 150 and 152; port 138 is connected to cutaway port 110 by intersecting passages 146 and 148; and port 140 is connected to recessed port 114 by intersecting passages 154 and 156. Cheek plate 32 is provided with duplicate sets of ports and passages identical with those provided for cheek plate 34, only two of which are shown in FIGURE 1. The ring passages and auxiliary cheek plate porting aid in providing better filling and displacement characteristics of the device and facilitate axial pressure balancing of the rotor and pressure balancing of the vanes.

In operation, if the device is operated as a motor and if pressure fluid from the outlet side of a fluid pump is directed to external connection port 98 of housing section 12, the chamber 90 will be the high pressure chamber of the device while chamber 92 will be under low pressure. Pressure fluid conducted to chamber 90 is conducted to fluid zones 64 and 66 by cutaway ports 104 and 106 of cheek plate 32, acting as fluid inlet ports, the pressure fluid acting on the vanes to turn the rotor and thus the shaft. Fluid displaced from the outlet zones 60 and 62 is conducted by cutaway ports 110 and 108 in cheek plate 34 to chamber 92 and by means of passage 100 to the external connection outlet port 102. When the outlet side of a fluid pump is connected to port 102 of housing section 14, chamber 92 becomes the high pressure chamber of the device and chamber 90 becomes the low pressure chamber. The cutaway ports 108 and 110 of cheek plate 34, now acting as fluid inlet ports, conduct pressure fluid to the fluid zones 62 and 60 for turning the rotor and shaft, and fluid is displaced from fluid zones 64 and 66 to chamber 90 by means of cutaway ports 104 and 106 and by means of passage 96 to the external connection port 98, now performing as an outlet port.

As hereinbefore explained, pressure increases in whichever is the high pressure chamber of the device, acting on the pressure motive portion of the outer face of the cheek plate facing the chamber, will urge the several components of the cartridge assembly together and also the complete cartridge toward the annular projection in the low pressure chamber of the device. The amount of shifting of the complete cartridge depends on the degree of manufacturing tolerance creating the clearances (shown in exaggerated form in FIGURE 1) between the shoulder portion of the hub and the abutments formed at the ends of the cavity. When the shoulder on the hub of the cheek plate facing the low pressure chamber contacts the annular projection, there is a tendency for the ring member which is being acted on by the pressure-loaded cheek plate to continue to axially shift the axially unsupported flanged portion of the other cheek plate, and because the centrally located portion of that same cheek plate is axially restrained by the abutment, a reaction force is created tending to dish or deflect inwardly the inner surface of the cheek plate at the side of the rotor. The pressure-loaded cheek plate on the opposite side of the rotor is, of course, deflected toward the rotor for reducing the running clearance on that side of the rotor, all of which is shown in exaggerated form in FIGURE 5. There is, therefore, a proper fluid sealing relation created between the inner surfaces of the cheek plates on both sides of the rotor through pressure loading of only one cheek plate, which cheek plate being pressure-loaded, however, being dependent on the directional operation of the device. This is accomplished whether the device is operated as a pump or as a motor and in either direction of operation without the use of any special valving.

While the form of embodiment of the invention as herein disclosed constitutes a preferred form, it is to be understood that other forms might be adopted, all coming within the scope of the claims which follow.

What is claimed is as follows:

1. A fluid pressure energy translating device comprising: a housing; an axially shiftable ring member in said housing; a rotor rotatably mounted within the ring member and forming a working chamber; a first floatably mounted cheek plate member having hydraulic pressure applied to one face thereof, the opposed face thereof mechanically contacting one face of said ring member in a generally annular region located near the periphery of said cheek plate member; a second cheek plate member having one face mechanically contacting the other face of said ring in a generally annular region located near the periphery of said second cheek plate member, the other face of said second cheek plate member being exposed to pressure relatively lower than applied to the first cheek plate member and mechanically contacting said housing axially only in a region radially inward from said generally annular region.

2. A fluid pressure energy translating device comprising: a housing; an axially shiftable spacer member supported on its outer periphery in said housing; a rotor rotatably mounted in the spacer member and forming fluid zones; a first shiftable cheek plate member supported on its outer periphery in said housing and having hydraulic pressure applied to one face thereof, the opposed face thereof mechanically contacting said spacer member in a region located near the periphery of said cheek plate member; a second cheek plate member supported on its outer periphery in said housing and having one face mechanically contacting said spacer member in a region located near the periphery of said cheek plate member, the other face of said cheek plate member being exposed to pressure relatively lower than applied to the first cheek plate member and mechanically contacting said housing axially only in a region radially inward from the spacer member contacting region.

3. A fluid pump or motor comprising: a housing having a cavity and abutment means at opposite ends of said cavity; a rotary fluid pressure energy translating device flotably mounted in the cavity and forming two fluid chambers, one on each side of the device, either of which is a high pressure chamber while the other is a low pressure chamber, said device comprising a rotor rotatably mounted within an axially shiftable spacer member to form two fluid zones, either of which is a fluid inlet zone while the other is a fluid outlet zone, and two axially shiftable cheek plates, one on each side of the spacer and rotor, said cheek plates having inner surface adapted to be urged into fluid sealing engagement and relation with the opposite side faces of the spacer and rotor, said cheek plates having outer surfaces, each of said cheek plate outer surfaces having a first pressure motive portion which extends from the outer periphery thereof radially inward beyond the spacer member and is exposed to the chamber immediately adjacent thereto for urging the said device toward the low pressure chamber and a second portion radially inward of said first portion adapted to be urged into engagement with the said abutment means immediately axially adjacent thereto when the chamber adjacent the pressure motive portion of the same cheek plate is the low pressure chamber; porting means in each cheek plate independently connecting one of said chambers to one of said fluid zones and the other of said chambers to the other of said fluid zones; and two flow passages, either of which is an inlet passage while the other is an outlet passage, independently connected to the chambers and opening exteriorly to the housing.

4. A fluid pump or motor comprising: a housing having a cavity and abutment means at opposite ends of said cavity; a rotary fluid pressure energy translating device mounted in the cavity and forming two fluid chambers, one on each side of the device, either of which may be a high pressure chamber while the other is a low pressure chamber, said device comprising a rotor of less width than and rotatably mounted within an axially shiftable spacer member to form two fluid zones, either of which is a fluid inlet zone while the other is a fluid outlet zone, and two floatably mounted elastic deflectable cheek plates, one on each side of the spacer and rotor, said cheek plates having inner surfaces both of which are adapted to be urged and deflected upon increases of pressure in whichever is the high pressure chamber of the device respectively into fluid sealing engagement and relation with the opposite side faces of the spacer and rotor, said cheek plates having outer surfaces, each cheek plate outer surfaces having a first axially unsupported pressure motive portion which extends from the outer periphery thereof radially inward beyond the spacer member and is exposed to the chamber immediately adjacent thereto and a second portion radially inward of said first portion adapted to be urged into engagement with the said abutment means immediately axially adjacent thereto when the pressure motive portion of the same plate is exposed to the low pressure chamber; porting means in each cheek plate independently connecting one of said chambers to one of said fluid zones and the other of said chambers to the other of said fluid zones; and two flow passages, either of which is an inlet passage while the other is an outlet passage, independently connected to the chambers and opening exteriorly to the housing.

5. A reversible fluid motor comprising: a housing having a cavity and abutment means at opposite ends of said cavity; a rotary fluid pressure energy translating device mounted in the cavity and forming two fluid chambers, either of which is a high pressure fluid inlet chamber while the other is a low pressure fluid outlet chamber, one on each side of the device, said device comprising a vane carrying rotor rotatably mounted within an axially shiftable vane track cam ring member to form two fluid zones, either of which is a fluid inlet zone while the other is a fluid outlet zone, and two axially shiftable cheek plates, one on each side of the cam ring member and rotor, said cheek plates having inner surfaces adapted to be urged into fluid sealing engagement and relation with the opposite side faces of the cam ring member and rotor, said cheek plates having outer surfaces, each cheek plate outer surface having a first axially unsupported pressure motive portion which extends from the outer periphery thereof radially inward beyond the cam ring member and is exposed to the chamber immediately adjacent thereto and a second portion radially inward of said first portion adapted to be urged into engagement by said ring member with the abutment immediately axially adjacent thereto, which cheek plate is pressure motive for urging the complete device toward whichever is the low pressure chamber and which cheek plate is mechanically loaded against one of said abutments being dependent on which is the high pressure inlet chamber of the motor; porting means in each cheek plate independently connecting the chambers immediately adjacent thereto to the fluid zones; and two flow passages, either of which may be an inlet passage while the other is an outlet passage, independently connected to the chambers and opening exteriorly to the housing.

6. A reversible fluid pump or motor comprising: a housing having a cavity and abutment means at opposite ends of said cavity; a rotary fluid pressure energy translating device mounted in the cavity and forming two fluid chambers, either of which is a fluid inlet chamber while the other is a fluid outlet chamber, one on each side of the device, said device comprising a vane carrying rotor of less width than and rotatably mounted within an axially shiftable vane track cam ring member to form two fluid zones, either of which is a fluid inlet zone while the other is a fluid outlet zone, and two floatably mounted, elastic deflectable cheek plates, one on each side of the cam ring member and rotor, said cheek plates having inner surfaces adapted to be urged and deflected upon increases of pressure in whichever is the high pressure chamber of the device respectively into fluid sealing engagement and relation with the opposite side faces of the cam ring member and rotor, said cheek plates having outer surfaces, each cheek plate outer surface having a first pressure motive portion which extends from the outer periphery thereof radially inward beyond the cam ring member and is exposed to the chamber immediately adjacent thereto and a second portion radially inward of said first portion adapted to be urged by said ring member into engagement with the said abutment means immediately axially adjacent thereto when the pressure motive portion of the same plate is exposed to the low pressure chamber of the device; porting means in each cheek plate independently connecting the chambers immediately adjacent thereto to the fluid zones; and two flow passages, either of which may be an inlet passage while the other is an outlet passage, independently connected to the chambers and opening exteriorly to the housing.

7. A reversible fluid pump or motor comprising: a housing having a cavity and coaxially arranged abutment means at opposite ends of said cavity; a rotary fluid pressure energy translating device mounted in the cavity and forming two fluid chambers, either of which is a high pressure chamber while the other is a low pressure chamber, one on each side of the device, said device comprising a vane carrying rotor rotatably mounted within an axially shiftable vane track cam ring member to form two pairs of diametrically opposed fluid zones, either pair of which may be fluid inlet zones while the other pair are fluid outlet zones, and two axially shiftable cheek plates, one on each side of the cam ring member and rotor, said cheek plates having inner surfaces adapted to be urged into fluid sealing engagement and relation with the opposite side faces of the cam ring member and rotor, said cheek plates having outer surfaces, each outer surface comprising a first axially unsuported pressure motive portion which extends from the outer periphery thereof radially inward beyond the cam ring member and is exposed to the chamber immediately adjacent thereto and a second portion radially inward of said first portion adapted to be urged by said ring member into engagement with the abutment means immediately axially adjacent thereto when the pressure motive portion of the same plate is exposed to the low pressure chamber; porting means in each cheek plate independently connecting one pair of fluid zones to one of said chambers and the other pair of fluid zones to the other of said chambers; and two flow passages, either of which may be a fluid inlet passage while the other is a fluid outlet passage, independently connected to the chambers and opening exteriorly to the housing.

8. A reversible pump or motor comprising: a housing, a cartridge assembly floatably mounted in the housing between opposed coaxially arranged abutment seating means and forming two chambers at opposite sides of the assembly, either of which is a high pressure chamber while the other is a low pressure chamber, the assembly including a vane carrying rotor circumscribed by an axially shiftable cam ring to form two fluid zones which are enclosed by a pair of floatably mounted cheek plates, the inner surfaces of said plates being adapted to be urged into fluid sealing engagement and relation with opposite side faces of the ring and rotor, said cheek plates having outer surfaces, each cheek plate outer surface having a first pressure motive portion which is exposed to the chamber adjacent thereto and a second portion which is located radially inward of the first pressure motive portion and which is both pressure motive and adapted for engaging the abument seating means immediately adjacent thereto, hydraulic pressure applied from whichever is the high pressure chamber to the first and second pressure motive portions of one cheek plate urging the cartridge assembly as a unit against the abutment seating means at the opposite end of said assembly, the inner surface of the pressure actuated plate being urged against said cam ring and toward said rotor, said cam ring contacting the inner surface of said other cheek plate and urging said cheek plate axially toward the low pressure chamber with the said second portion of its outer surface engaging the abutment seating means adjacent thereto and thereby creating a reaction force for urging the inner surface of said other cheek plate against the cam ring and toward the rotor; two flow passage means, either of which may be an inlet passage while the other is an outlet passage, independently connected to the chambers and opening to the exterior of the housing; and porting means in each cheek plate independently connecting one of said chambers to one of said fluid zones and the other of said chambers to the other of said fluid zones.

9. A reversible pump or motor comprising: a housing; a cartridge assembly floatably mounted in the housing between opposed coaxially arranged abutment seating means and forming two chambers at opposite sides of the assembly, either of which is a high pressure chamber while the other is a low pressure chamber, the assembly including a vane carrying rotor circumscribed by an axially shiftable cam ring of greater width than the rotor to form two fluid zones which are enclosed by a pair of axially shiftable, elastic deflectable cheek plates, the inner surfaces of which are adapted to be urged and deflected respectively into fluid sealing engagement and relation with opposite side faces of the ring and rotor, said cheek plates having outer surfaces, each outer surface comprising a first pressure motive portion which extends from the periphery thereof radially inward beyond the cam ring and is exposed to the chamber adjacent thereto, and a second portion which is located radially inward of the first pressure motive portion and which is both pressure motive and adapted for engaging the abutment seating means immediately adjacent thereto, hydraulic pressure from the high pressure chamber of the device imposed on the pressure motive portions of one cheek plate for urging the cartridge assembly as a unit against the abutment seating means at the opposite end of said assembly, the inner surface of the pressure loaded plate being urged against said cam ring and deflected toward said rotor, said cam ring contacting the inner surface of the other cheek plate and urging the other cheek plate toward the low pressure chamber with the said second portion of its outer surface engaging the abutment seating means adjacent thereto thereby creating a reaction force urging the inner surface of said other cheek plate against the cam ring and deflecting the said inner surface toward the rotor; two flow passage means, either of which may be an inlet passage while the other is an outlet passage, independently connected to the chambers and opening to the exterior of the housing; and porting means in each cheek plate independently connecting one of said chambers to one of said fluid zones and the other of said chambers to the other of said fluid zones.

10. A reversible fluid pressure energy translating device comprising: a housing having a stepped bore and coaxially arranged abutments; a pump or motor unit mounted in the bore comprising a rotor rotatably mounted within an axially shiftable spacer member to form two fluid zones, either of which may be a fluid inlet zone while the other is a fluid outlet zone, and two floatably mounted, cheek plates each having inner and outer surfaces, one plate on each side of the spacer and rotor, each outer surface including a flanged portion, an abutment engaging portion, and a hub portion, said unit together with the housing forming two pairs of chambers, one pair at each end of the bore, one chamber of each said pair of chambers continuously being a low pressure chamber within which the hub portions of the cheek plates are respectively mounted, the flanged portions of said cheek plates being respectively exposed in said other chambers, either of said other chambers being a high pressure chamber while the other of said other chambers being a low pressure chamber and either of said check plates being pressure motive in response to hydraulic pressure from the high pressure chamber while the other cheek plate is abutment engaging depending on the direction of operation of the device, the complete unit being hydraulically axially urged toward and into engagement with either of said abutments for urging the inner surfaces of the cheek plates in fluid sealing engagement and relation with opposite sides of the spacer and rotor; means forming two flow passages independently connected to the chambers and opening to the exterior of the housing; and porting means in each cheek plate connecting one of said chambers to one of said fluid zones and the other of said chambers to the other of said fluid zones.

11. A reversible fluid pressure energy translating device comprising: a housing having a stepped bore and coaxially arranged abutments; a pump or motor unit floatably mounted in the bore comprising a rotor rotatably mounted within a spacer member to form two fluid zones, either of which may be a fluid inlet zone while the other is a fluid outlet zone, and two cheek plates having inner and outer surfaces, one plate on each side of the spacer and rotor, said outer surfaces including a flanged portion, an abutment engaging portion, and a hub portion, said unit together with the housing forming two pairs of chambers, one pair at each end of the bore, one chamber of each said pair of chambers continuously being a low pressure chamber within which the hub portions of the cheek plates are respectively mounted, the flanged portions of said cheek plates being respectively exposed in said other chambers and also being axially unrestrained toward said chambers, which of said other chambers being high pressure and which of said cheek plates being pressure motive while the other is abutment engaging depending on the direction of operation of the device, the complete unit being hydraulically urged toward and into engagement with one of said abutments in one direction of operation and in engagement with the other abutment in the other direction of operation for urging the inner surfaces of the cheek plates in fluid sealing engagement and relation with opposite sides of the spacer and rotor; means forming two flow passages independently connected to the chambers and opening to the exterior of the housing; and porting means in each cheek plate connecting one of said chambers to one of said fluid zones and the other of said chambers to the other of said fluid zones.

12. A reversible fluid pressure energy translating device comprising: a housing having a stepped bore and coaxially arranged abutments; a pump or motor unit floatably mounted in the bore comprising a rotor rotatably mounted within a spacer member to form two fluid zones, either of which may be a fluid inlet zone while the other is a fluid outlet zone, and two elastic deflectable cheek plates having inner and outer surfaces, one plate on each side of the spacer and rotor, said outer surfaces including a flanged portion, an abutment engaging portion, and a hub portion, said unit together with the housing forming two pairs of chambers, one pair at each end of the bore, one chamber of each said pair of chambers being a continuously low pressure chamber within which the hub portions of the cheek plates are respectively mounted, the flanged portions of said cheek plates being respectively exposed in said other chambers, which one of said other chambers being high pressure and which one of said cheek plates being pressure motive while the other engages one of said abutments depending on the direction of operation of the device, the complete unit being hydraulically urged toward and into engagement with either of said abutments for respectively urging and simultaneously deflecting the inner surfaces of both of said cheek plates in fluid sealing engagement and relation with opposite sides of the spacer and rotor; means forming two flow passages independently connected to the chambers and opening to the exterior of the housing; and porting means in each cheek plate connecting one of said chambers to one of said fluid zones and the other of said chambers to the other of said fluid zones.

13. A reversible fluid pressure energy translating device comprising: a housing having a bore and axial abutment means at the ends of the bore; a pump or motor unit floatably mounted within the bore and forming two chambers, one at each side of the unit and either of which is a high pressure chamber while the other is a low pressure chamber, said unit comprising a rotor rotatably mounted within an axially shiftable spacer member to form two fluid zones, either of which is an inlet zone while the other is an outlet zone, and two cheek plates each having inner and outer surfaces, said inner surfaces mechanically contacting opposite sides of said spacer member, each outer surface comprising a first axially unsupported pressure motive portion exposed to the chamber adjacent thereto and adapted when said adjacent chamber is the high pressure chamber to urge the complete unit toward whichever is the low pressure chamber, and a second portion radially inward of the first portion adapted to axially seat against the said abutment means adjacent thereto when the chamber adjacent the pressure motive portion of the same plate is the low pressure chamber; means forming two flow passages independently connected to the chambers and opening to the exterior of the housing; and porting means in each cheek plate connecting one of said chambers to one of said fluid zones and the other of said chambers to the other of said fluid zones.

14. A reversible fluid pressure energy translating device comprising: a housing having a bore and axial abutment means at the ends of the bore; a pump or motor unit floatably mounted within the bore and forming two chambers, one at each side of the unit, either of which is a high pressure chamber while the other is a low pressure chamber, said unit comprising a rotor rotatably mounted within an axially shiftable spacer member to form two fluid zones, either of which may be an inlet zone while the other is an outlet zone, and two axially shiftable, elastic deflectable cheek plates each having inner and outer surfaces, said inner surfaces mechanically contacting opposite sides of said spacer member and providing running clearance for said rotor, each outer surface comprising a first axially unsupported pressure motive portion exposed to the chamber adjacent thereto and adapted when said chamber is the high pressure chamber for urging the complete unit toward the low pressure chamber and a second portion radially inward of said first portion axially engaging the said abutment means adjacent thereto when the chamber adjacent the pressure motive portion of the same plate is the low pressure chamber, both cheek plaes being deflected for reducing the running clearance on both sides of said rotor in response to predetermined increases of pressure in the high pressure chamber; means forming two flow passages independently connected to the chambers and opening to the exterior of the housing; and porting means in each cheek plate connecting one of said chambers to one of said fluid zones and the other of said chambers to the other of said fluid zones.

15. A reversible fluid pressure energy translating device comprising: a housing; an axially shiftable cam ring member supported on its outer periphery in said housing; a rotor carrying a plurality of sliding vanes mounted within the cam ring and forming a working chamber; two aixally shiftable cheek plates supported on their outer peripheries within the housing, each plate having an inner and an outer face, said inner faces contacting opposite sides of said cam ring member in an annular region located near the peripheries of said cheek plates; means applying relatively high hydraulic pressure to the outer face of either cheek plate while applying a relatively low pressure to the outer face of the other cheek plate; and means forming opposed axial abutments for the outer faces of said cheek plates, one of which is engaged by the outer face of one cheek plate in one direction of operation and the other of which is engaged by the outer face of the other cheek plate in the other direction of operation, said outer faces of said cheek plates being axially unrestrained excepting for said abutments, and said abutments being located to axially engage the outer faces of said cheek plates in an anuular region radially inward from the sides of said ring member.

16. A reversible fluid pressure energy translating device comprising: a housing; an axially shiftable ring member in said housing; a rotor of less width than the ring member rotatably mounted within the ring member and forming a working chamber; two cheek plate members floatably mounted in the housing, each cheek plate having an inner face which contact opposite faces of said ring member in a generally annular region located near the peripheries of said cheek plates, each cheek plate having an outer face unsupported axially in said generally anular region, hydraulic pressure being applied to the outer face of one cheek plate in one directional operation of the device and being applied to the outer face of the other cheek plate in the other directional operation of the device, the outer surface of the remaining cheek plate in each instance being exposed to a relatively lower pressure, the outer surface of the cheek plate exposed to the relatively lower pressure being urged by said ring member in contact with said housing axially only in a region radially inward from said generally annular region.

17. A reversible fluid pressure energy translating device comprising: a housing; an axially shiftable ring member in said housing; a rotor of less width than the ring member rotably mounted within the ring member and forming a working chamber; two cheek plate members floatably mounted in the housing, each cheek plate having an inner face and an outer face, said inner faces being adapted to engage the opposite sides of said ring member in a generally annular region located near the peripheries of said cheek plate members; means forming two chambers, one on each side of and immediately adjacent each cheek plate outer face, either of which is a high pressure fluid chamber while the other is a low pressure fluid chamber dependent on the directional operation of the device; and means forming opposed axial abutments for said cheek plate outer surfaces, the outer surfaces of both cheek plates being axially unsupported in said generally annular region and the outer surface of that cheek plate adjacent the low pressure chamber in each instance being urged by said ring member axially against its abutment only in a region radially inward from said generally annular region.

References Cited by the Examiner

UNITED STATES PATENTS

| | | | |
|---|---|---|---|
| 2,636,481 | 4/53 | Rosean | 121—92 |
| 2,738,774 | 3/56 | Rosean | 121—92 |
| 2,787,959 | 4/57 | Jeannin | 103—136 |
| 2,790,391 | 4/57 | Holl | 103—136 |
| 2,924,182 | 2/60 | Blasutta | 103—136 |
| 2,955,542 | 10/60 | Gaubatz | 103—136 |
| 2,971,469 | 2/61 | McLean | 103—216 |
| 3,024,736 | 3/62 | Erdmann | 103—136 |

KARL J. ALBRECHT, *Primary Examiner.*

LAURENCE V. EFNER, *Examiner.*